United States Patent
Mulvaney

(10) Patent No.: US 10,023,829 B1
(45) Date of Patent: Jul. 17, 2018

(54) BLUE WHISKEY AND METHOD FOR MAKING BLUE-COLORED WHISKEY

(71) Applicant: Ted Mulvaney, Reno, NV (US)

(72) Inventor: Ted Mulvaney, Reno, NV (US)

( * ) Notice: Subject to any disclaimer, the term of this patent is extended or adjusted under 35 U.S.C. 154(b) by 0 days.

(21) Appl. No.: 15/585,341

(22) Filed: May 3, 2017

(51) Int. Cl.
*C12G 3/02* (2006.01)
*C12G 3/04* (2006.01)
*A23L 5/43* (2016.01)

(52) U.S. Cl.
CPC ............... *C12G 3/04* (2013.01); *A23L 5/43* (2016.08); *A23V 2002/00* (2013.01)

(58) Field of Classification Search
CPC ..................................... C12G 3/04; A23L 5/43
See application file for complete search history.

(56) References Cited

U.S. PATENT DOCUMENTS

| | | | | |
|---|---|---|---|---|
| 2,119,334 A * | 5/1938 | Leffler | ............. | F16D 1/08 29/432 |
| 3,386,832 A * | 6/1968 | McCabe | ............. | C12G 3/065 426/422 |
| 5,741,662 A * | 4/1998 | Madsen | ............. | G01N 33/569 435/34 |
| 7,282,584 B2 * | 10/2007 | Molenberg | ............. | C08F 2/50 544/37 |
| 8,597,613 B2 * | 12/2013 | Maloney | ............. | C07D 279/18 424/1.11 |
| 2005/0158798 A1 * | 7/2005 | Sher | ............. | C12C 12/00 435/7.1 |
| 2007/0248730 A1 * | 10/2007 | Wood | ............. | B01D 3/004 426/494 |
| 2007/0281052 A1 * | 12/2007 | Goodwin | ............. | B01D 3/001 426/11 |
| 2012/0088018 A1 * | 4/2012 | Lix | ............. | B24C 1/04 426/422 |

\* cited by examiner

*Primary Examiner* — Michele L Jacobson
*Assistant Examiner* — Philip A Dubois
(74) *Attorney, Agent, or Firm* — Mark A. Goodman, Esq.

(57) ABSTRACT

The present invention is directed to a method of preparing a blue-colored whiskey by mixing methylene blue, pure alcohol and distilled water. This process creates a staining solution and would allow the staining solution be aged in a cask prior to adding the whiskey into the cask. The stained cask colors the whiskey solution. This whiskey making method is designed to generate blue whiskey in which the color of the distillate is not directly altered. Further, this method provides a new way of presenting such beverages to potential customers in a pleasing way that could potentially enhance market share, and provides a new method to change beverages into new and unusual colors which may provide fun and additional marketing/branding opportunities.

8 Claims, 1 Drawing Sheet

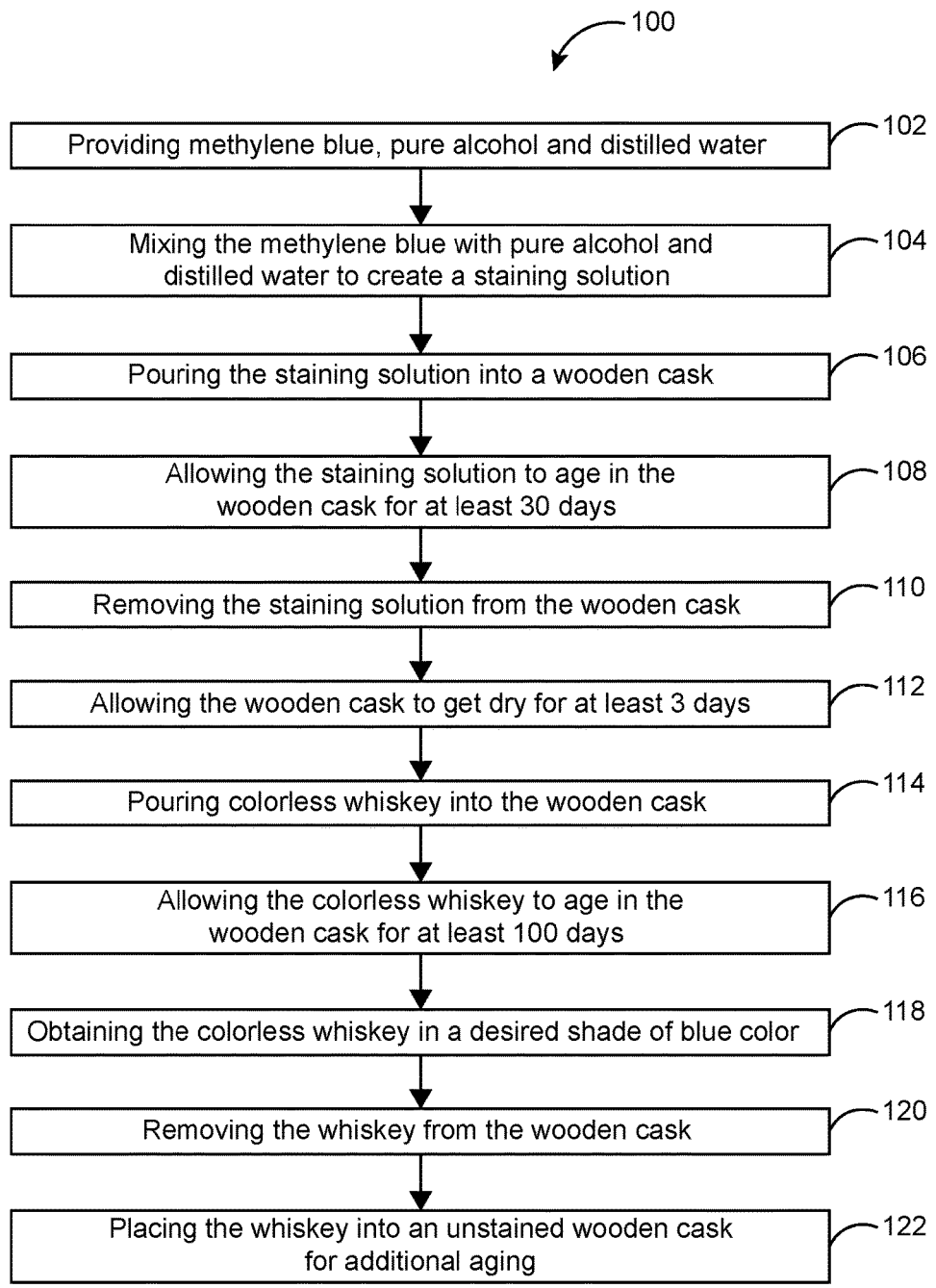

BLUE WHISKEY AND METHOD FOR MAKING BLUE-COLORED WHISKEY

BACKGROUND OF THE DISCLOSURE

Technical Field of the Disclosure

This invention relates to a method of providing color enhancement to beverages, and more particularly to a blue colored-whiskey and a method of preparing a blue-colored whiskey.

Description of the Related Art

The idea of adding colorant to alcoholic beverage is known in the art. The traditional and conventional alcohol industry approach generally produces straw-colored, light yellow to golden yellow or dark brown alcohol. Drinks have been colored in a couple of ways. It is well known that there are a variety of alcoholic beverages in the art, and that different types of alcoholic beverages may have different colors, but each type has a typical color. Whisky is a spirit produced from fermented grain and aged in wood. A spirit is any alcoholic beverage in which the alcohol content has been increased by distillation. By the process of distillation an alcoholic beverage is heated in order to boil off, collect, and concentrate the alcohol. The color of the whisky is the first thing noticed when it poured into a glass. The color can give a clue to the type of cask used.

Traditionally oak has been used for the manufacture of casks for storing alcoholic beverages. The casks are made from shaped oak wood blocks which may be heat treated to provide a particular flavoring and color characteristics to beverages stored in a particular cask. In addition, other oak wood products, for example, oak blocks, shavings or extracts have been added to alcoholic beverages to provide a particular flavor or color characteristics. It has been the practice for many years to store beverages over long periods in oak barrels which have been previously charred in order to give the beverages a distinctive color. Different methods are available to provide improved coloring and flavoring from oak wood which are desirable for different brands of alcohol. There is considerable competition among manufacturers of such beverages to reach a target market and accomplish sales as market share.

A conventional approach describes a method to darken the color of some whiskies and other beverages. This is achieved by the addition of whiskey caramel coloring. Caramel coloring is a product of burning sugars like fructose and glucose until they have turned into a dark syrup. This process merely adds color to whiskey. And the source of color that the distillate derives does not change. In addition, the color of the distillate is directly altered by the additive. In many countries, however, the rules governing the use of caramel coloring are more restrictive than in the US.

Another approach describes a method of treating wood for use in manufacturing casks containing alcoholic beverages to provide the desired color enhancement of such beverages. This method uses salt and simple organic compound solutions for the purpose of providing the desired color to the alcoholic beverage. This method is suitable where casks are regenerated and heat treated. However, this method requires heat treatment for the wood blocks for a long period of time at a high temperature in order to develop the required range of color in the alcoholic beverage. Moreover, soaking wood blocks in the salt solution to change the color of beverage does not ensure a specific consumer-desired color for the alcoholic beverage obtained from the treated wood.

Another approach describes a fermented alcoholic beverage that is imparted a beer-like, natural color level and flavor produced by using artificial food colorings. The food coloring is simply added to the whiskey to provide it with the desired color. However, because of whiskey's natural dark color, the food coloring can make the whiskey an even darker shade of undesirable brown. Further, it requires that the additive to be added directly to the beverage itself.

Yet another approach describes a method for making an alcoholic beverage for human consumption having taste qualities and color enhancement similar to one aged for a conventional aging period, said method comprising the steps of placing distillate into a container where it is in contact with a wood surface area, and controllably varying the pressure within the container during a 24 hour cycle so that the pressure varies at least 1 ATM between a maximum pressure and a minimum pressure and repeating said pressure-varying steps for a period less than nine months. With this method, the time to market is dramatically decreased, and long-term storage needs are reduced. However, the concept of creating a staining solution and aging the staining solution in the cask, then using the stained cask to stain the whiskey solution is not possible. Moreover, no methylene blue powder is added to provide color to the alcoholic beverage.

Therefore, there is a need for blue colored whiskey and a method to prepare blue color whiskey. Further, this product and method would provide a new way of presenting such beverages to potential customers in a pleasing way that could potentially enhance market share, and provide a new method to change beverages into new and unusual colors which may provide fun and additional marketing/branding opportunities. For example fans of popular sports teams having blue uniforms could get together and enjoy this blue whiskey while cheering on their favorite team. Further, the blue whiskey could be branded associated with other pleasing blue natural things such as the ocean, sky, lakes, rivers, etc. The present embodiment overcomes prior art shortcomings by accomplishing these critical objectives.

SUMMARY OF THE DISCLOSURE

To minimize the limitations found in the prior art, and to minimize other limitations that will be apparent upon the reading of the specification, the present invention is blue whiskey and a method for making blue-colored whiskey. The method comprises mixing methylene blue with pure alcohol and distilled water to create a staining solution. The staining solution comprises a ratio of greater than 20 but less than 100 parts methylene blue, 1500 parts pure alcohol and 18,927 parts water. Then, pouring the staining solution into a wooden cask. The staining solution is allowed to age in the wooden cask for at least 30 days. The staining solution is removed from the wooden cask and then allows the cask to get dry. The wooden cask is allowed to dry for at least 3 days prior to pouring the colorless whiskey into the cask. The colorless whiskey is selected from a group consisting of corn whiskey, rye whiskey, barley whiskey, and bourbon whiskey. Further, allowing the colorless in the wooden cask to age until the colorless whiskey reaches a desired shade of blue color. The colorless whiskey is aged in the wooden cask for at least 100 days to obtain a desired shade of blue color. The method further comprising the steps of removing the whiskey from the wooden cask and then placing the whiskey into an unstained wooden cask for additional aging.

A first objective of the present invention is to provide a method to prepare blue color whiskey by adding methylene blue powder with pure alcohol and water.

A second objective of the present invention is to provide a new step for the creation of whiskey in which the color of the distillate is not directly altered.

A third objective of the present invention is to generate blue whiskey.

A fourth objective of the present invention is to create a staining solution and aging the staining solution in a cask and then using the stained cask to stain the whiskey.

These and other advantages and features of the present invention are described with specificity so as to make the present invention understandable to one of ordinary skill in the art.

BRIEF DESCRIPTION OF THE DRAWINGS

In order to enhance their clarity and improve understanding of these various elements and embodiments of the invention, elements in the figures have not necessarily been drawn to scale. Furthermore, elements that are known to be common and well understood to those in the industry are not depicted in order to provide a clear view of the various embodiments of the invention, thus the drawings are generalized in form in the interest of clarity and conciseness.

FIG. 1 is a general flowchart showing a method to prepare blue color whiskey.

DETAILED DESCRIPTION OF THE PREFERRED EMBODIMENT

In the following discussion that addresses several embodiments and applications of the present invention, reference is made to the accompanying drawings that form a part hereof, and in which is shown by way of illustrating specific embodiments in which the invention may be practiced. It is to be understood that other embodiments may be utilized and changes may be made without departing from the scope of the present invention.

Various inventive features are described below that can each be used independently of one another or in combination with other features. However, any single inventive feature may not address any of the problems discussed above or only address one of the problems discussed above. Further, one or more of the problems discussed above may not be fully addressed by any of the features described below. The invention will now be described with reference to the accompanying drawings which do not limit the scope of the invention. In the following discussion that addresses a number of embodiments and applications of the present invention, reference is made to the accompanying drawings that form a part hereof, and in which is shown by way of illustrating specific embodiments in which the invention may be practiced. It is to be understood that other embodiments may be utilized and changes may be made without departing from the scope of the present invention.

Referring to FIG. 1, a general flow chart shows a method of preparing blue-colored whiskey 100 of the present invention. The method is initiated by providing methylene blue, pure alcohol and distilled water to prepare the blue-colored whiskey as shown in block 102. Initially, the methylene blue is mixed with pure alcohol and distilled water to create a staining solution as indicated at block 104. Then, pouring the staining solution into a wooden cask as indicated at block 106. The staining solution is allowed to age in the wooden cask for at least 30 days as indicated at block 108. The staining solution is then removed from the wooden cask as indicated at block 110. Further, allowing the wooden cask to get dry for at least 3 days as shown in block 112. Then, pouring colorless whiskey into the wooden cask as shown in block 114. Furthermore, allowing the colorless whiskey to age in the wooden cask for at least 100 days as shown in block 116. Thus, obtaining the colorless whiskey in a desired shade of blue color as shown in block 118. Then, removing the whiskey from the wooden cask and finally placing the whiskey into an unstained wooden cask for additional aging as shown in blocks 120 and 122.

The staining solution is made from methylene blue powder diluted in everclear alcohol and distilled water. The methylene is dissolved in the everclear alcohol before adding it into the distilled water. The methylene blue is a non-toxic stain with multiple medicinal applications. The amount of methylene blue can vary, depending on how deep a blue is desired. The staining solution comprises a ratio of greater than 20 but less than 100 parts methylene blue, 1500 parts pure alcohol and 18,927 parts water. The staining solution is being kept in the wooden cask for a period of at least 30 days which varies depending on how much stain is desired. The colorless whiskey which poured into the wooden cask is selected from a group consisting of corn whiskey, rye whiskey, barley whiskey, and bourbon whiskey. The duration of the aging is variable depending on the quality desired, size of the cask, the color desired, etc. The result is a blue whiskey without any trace of the brown in traditional whiskey. Moreover, as expected and consistent with how whiskey production has always been, the time in the cask significantly improved the flavor and color of the whiskey. This process does not merely add color to whiskey. Instead, the process introduces a new step in the creation of whiskey in which the source of color that the distillate derives is changed. The color of the distillate is never directly altered. This process of staining the cask in which the whiskey is aged can be applied as easily to rye whiskey as it could to corn or malt, in fact, it works with any whiskey product that doesn't require a certain state of the wooden cask, that is, for the cask to be charred or to have previously been used to age a specific type of alcoholic beverage.

The claimed subject matter has been provided here with reference to one or more features or embodiments. Those skilled in the art will recognize and appreciate that, despite of the detailed nature of the exemplary embodiments provided here; changes and modifications may be applied to said embodiments without limiting or departing from the generally intended scope. These and various other adaptations and combinations of the embodiments provided here are within the scope of the disclosed subject matter as defined by the claims and their full set of equivalents.

The foregoing description of the preferred embodiment of the present invention has been presented for the purpose of illustration and description. It is not intended to be exhaustive or to limit the invention to the precise form disclosed. Many modifications and variations are possible in the method of preparing blue-colored whiskey of the above teachings. It is intended that the scope of the present invention not be limited by this detailed description, but by the claims and the equivalents to the claims appended hereto.

What is claimed is:

1. A method for making blue whiskey comprising the steps of:
   a. mixing methylene blue with pure alcohol and water creating a staining solution;
   b. pouring the staining solution into a wooden cask;

c. removing the staining solution from the wooden cask;
d. allowing the wooden cask to dry;
e. pouring colorless whiskey into the wooden cask;
f. aging the colorless whiskey in the wooden cask until the colorless whiskey reaches a desired shade of blue color.

2. The method of claim 1 wherein the staining solution comprises a ratio of:
   a. greater than 20 but less than 100 parts methylene blue;
   b. 1500 parts pure alcohol;
   c. 18,927 parts water.

3. The method of claim 1 wherein the water comprises distilled water.

4. The method of claim 1 wherein the colorless whiskey is selected from the group consisting of corn whiskey, rye whiskey, barley whiskey, and bourbon whiskey.

5. The method of claim 1 wherein the staining solution is allowed to age in the wooden cask for at least 30 days prior to removal.

6. The method of claim 1 wherein the wooden cask is allowed to dry for at least 3 days prior to pouring in the colorless whiskey.

7. The method of claim 1 wherein the colorless whiskey is aged in the wooden cask for at least 100 days.

8. The method of claim 1 further comprising the steps of:
   a. removing the whiskey from the wooden cask;
   b. placing the whiskey into an unstained wooden cask for additional aging.

* * * * *